(12) United States Patent
Zhao et al.

(10) Patent No.: US 12,195,670 B1
(45) Date of Patent: Jan. 14, 2025

(54) MUSSEL BIOMIMETIC HEAT-RESISTANT AND SALT-TOLERANT THICKENER, PREPARATION METHOD THEREFOR, AND GEL FRACTURING FLUID, PREPARATION METHOD AND USE THEREOF

(71) Applicant: China University of Petroleum (East China), Qingdao (CN)

(72) Inventors: Mingwei Zhao, Qingdao (CN); Zhongzheng Xu, Qingdao (CN); Caili Dai, Qingdao (CN); Lin Li, Qingdao (CN); Yining Wu, Qingdao (CN); Zhenfeng Ma, Qingdao (CN); Mingwei Gao, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/590,758

(22) Filed: Feb. 28, 2024

(30) Foreign Application Priority Data

Dec. 1, 2023 (CN) .......................... 202311641979.6

(51) Int. Cl.
*C09K 8/60* (2006.01)
*C09K 8/68* (2006.01)
*C09K 8/90* (2006.01)

(52) U.S. Cl.
CPC .............. *C09K 8/685* (2013.01); *C09K 8/905* (2013.01)

(58) Field of Classification Search
CPC ................................ C09K 8/685; C09K 8/905
See application file for complete search history.

(56) References Cited

U.S. PATENT DOCUMENTS

2022/0154064 A1*  5/2022  Dai ........................ C09K 8/516

FOREIGN PATENT DOCUMENTS

| CN | 108018035 B | | 5/2018 |
|---|---|---|---|
| CN | 112111264 B | | 12/2020 |
| CN | 112409611 A | | 2/2021 |
| CN | 113600095 A | | 11/2021 |
| CN | 114621743 A | | 6/2022 |
| CN | 114805115 A | | 7/2022 |
| CN | 115074106 B | | 9/2022 |
| CN | 115636908 A | * | 1/2023 |

* cited by examiner

*Primary Examiner* — Kumar R Bhushan
(74) *Attorney, Agent, or Firm* — Volpe Koenig

(57) ABSTRACT

The present discloses a mussel biomimetic heat-resistant and salt-tolerant thickener and a preparation method therefor, a gel fracturing fluid and a preparation method and use thereof.

3 Claims, 4 Drawing Sheets

| taking acrylic anhydride and dopamine hydrochloride (DOPA) as reaction raw materials, synthesizing a mussel biomimetic catechol monomer (3-acrylamido dopamine, AM-DOPA) containing both an addible ethylene group and a mussel biomimetic catechol (catechol) group | S101 |

↓

| using 2-bromomethyl propionate, potassium ethylxanthate and acrylamide as reaction raw materials, and using 4,4'-azobis (4-cyanovaleric acid) as an initiator, synthesizing a water-soluble macromolecular chain transfer agent xanthate ester (PAM-X) for reversible addition-fragmentation chain transfer (RAFT) polymerization reaction | S102 |

↓

| using acrylamide (AM), sodium acrylate (AANa), 2-acrylamide-2-methylpropanesulfonic Acid (AMPS), and 3-acrylamide dopamine (AM-DOPA) as reaction raw materials, and using a RAFT active/controllable polymerization method for synthesizing the mussel biomimetic heat-resistant and salt-tolerant thickener | S103 |

FIG. 1

| Adding the prepared mussel biomimetic heat-resistant and salt-tolerant thickener (p[AM-AANa-DOPA-AMPS]) into a certain amount of water, stirring till the polymer is completely dissolved to obtain a first reaction system | S201 |

↓

| Slowly adding a crosslinking agent into the first reaction system (the crosslinking agent is one of organic zirconium, phenolic resin, and polyethylene imine), stirring till the crosslinking agent is sufficiently and mutually dissolved, placing it in an oven to carry out the aging reaction, a supramolecular function enhanced gel fracturing fluid is obtained | S202 |

FIG. 2

MUSSEL BIOMIMETIC HEAT-RESISTANT AND SALT-TOLERANT THICKENER, PREPARATION METHOD THEREFOR, AND GEL FRACTURING FLUID, PREPARATION METHOD AND USE THEREOF

CROSS-REFERENCE TO RELATED APPLICATIONS

The application claims priority to Chinese Application No. 202311641979.6, filed on Dec. 1, 2023, entitled "Mussel Biomimetic Heat-resistant and Salt-tolerant Thickener, Preparation method therefor, and Gel Fracturing Fluid, Preparation Method and Use thereof", which is herein specifically and entirely incorporated by reference.

FIELD

The present disclosure relates to the field of deep/ultra-deep layer oil and gas reservoir fracturing fluids, in particular to a mussel biometric heat-resistant and salt-tolerant thickener and a preparation method therefor, a gel fracturing fluid and a preparation method and use thereof.

BACKGROUND

Along with the continuous deepening of exploration and development levels, the oil and gas exploration and development in China have evolved from the middle shallow layer to the deep layer and ultra-deep layer. The deep/ultra-deep layer oil and gas resources are key breakthrough fields of future oil and gas exploration and development, reservoir and production increase in China. Fracturing is an important means for implementing the efficient development of ultra-deep layer oil and gas, but the ultra-high temperature conditions of ultra-deep fracturing impose a new challenge on the fracturing fluids. Ultra-deep fracturing development is accompanied by the harsh conditions of ultra-high temperatures, which impose higher requirements on the properties of the fracturing fluid. The adoption of a gel fracturing fluid with a space network structure is the most commonly used method for improving the temperature resistance and shearing resistance of the fracturing fluid. The thickening agent is one of the key materials of the gel fracturing fluid, its main function is to keep the viscosity of a fracturing fluid system under the operating conditions and endow the system with certain wellbore drag reduction and reservoir stratum sand carrying capacity. The existing thickeners of the fracturing fluids are prone to decompose and rupture under the high-temperature condition, so the system is destabilized and the viscosity is rapidly reduced, thus the technical requirements of fracturing operation cannot be met.

The high-temperature resistant thickeners of the water-based fracturing fluid which are commonly used at home and abroad mainly comprise guar gum and derivatives thereof, viscoelastic surfactants, and synthetic polymers.

In terms of the guar gum and derivatives thereof, CN112111264B discloses a guar gum grafted copolymer nano-composite gel fracturing fluid and a preparation method thereof. The fracturing fluid comprises the following components in percentage by mass: 0.4-1.2% of a guar gum grafted copolymer thickening agent, 0.05-0.5% of a nanomaterial, and 0.2-1% of a cross-linking agent, with the balance being water; the guar gum graft copolymer thickening agent is synthesized from the following components in parts by weight: 2-10 parts of guar gum or guar gum derivatives, 5-25 parts of acrylamide monomers, 0.1-2 parts of an initiator and 800-1,500 parts of water; hydrophilic flexible polymer branched chains are introduced to semi-rigid macromolecular chains of guar gum, and then the hydrophilic flexible polymer branched chains are used as a thickening agent, the nanomaterial dispersion liquid is added, and the nano-composite gel fracturing fluid is prepared under the action of a cross-linking agent. The fracturing fluid is sheared under the shearing rate of 170 s$^{-1}$ and the temperature of 160° C. for 2 hours, and the reserved viscosity is less than 100 mPa·s. CN108018035B discloses a shear-resistant low-concentration guar gum zirconium gel fracturing fluid, which comprises the following components in percentage by mass: 0.2-0.6% of carboxymethyl hydroxypropyl guar gum, 0.1-0.4% of a clay stabilizer, 0.2-0.4% of a discharge aiding agent, 0.2-0.4% of a cross-linking agent, 0.1-0.3% of a rheology modifier, a pH adjuster and water; the cross-linking agent is selected from an organic zirconium cross-linking agent or a water-based zirconium cross-linking agent; wherein the organic zirconium cross-linking agent is selected from the group consisting of tetra (n-propyl) zirconate, tetra (triethanolamine) zirconate, tetra lactic acid zirconate, tri (triethanolamine) lactate zirconate; the water-based zirconium cross-linking agent is a complex formed by the reaction of an inorganic zirconium salt with a hydroxycarboxylate salt; the guar gum zirconium gel fracturing fluid is sheared under the shearing rate of 170 s$^{-1}$ and the temperature of 160° C. for 90 min, and the apparent viscosity of the system is 124 mPa·s. The modified guar gum actually improves the temperature resistance of the guar gum fracturing fluid and widens the use boundary of the guar gum fracturing fluid, but is retrained by the temperature resistance limit of glycosidic bonds in the guar gum macromolecular chain (the guar gum will be degraded when the temperature exceeds 177° C.), so that the upper limit of the use temperature of the guar gum fracturing fluid is 180-200° C.

In terms of the viscoelastic surfactants, the viscoelastic surfactant fracturing fluid forms micelles through strong interaction between the viscoelastic surfactant and counter ions, so the system has excellent viscoelastic characteristics and sand-carrying performance. CN114805115A discloses a temperature-resistant dihydroxyl cationic viscoelastic surfactant and a preparation method thereof, a fracturing fluid and use thereof, wherein the temperature-resistant dihydroxyl cationic viscoelastic surfactant is used as a thickener of a clean fracturing fluid when the added amount of the surfactant is 5 wt %, the viscosity is maintained at 30 mPa·s after shearing under the shearing rate of 170 s$^{-1}$ and the temperature of 220° C. for 2 hours. CN113600095A discloses a beta-CD gemini viscoelastic surfactant, a preparation method thereof, and a temperature-resistant and salt-resistant clean fracturing fluid, wherein the clean fracturing fluid prepared with 3% of a thickening agent and 3% of NaSal is sheared for 90 min under the shearing rate of 170 s$^{-1}$ and the temperature of 120° C., the system viscosity can be maintained at about 100 mPa·s. The existing method for improving the temperature resistance of the surfactant fracturing fluids is mainly realized through research and development of viscoelastic surfactants with complex structures, most of the fracturing fluids can only be used in medium-high temperature reservoir stratum, and generally suffer from problems such as difficult industrial production, large dosage of thickening agents, and high costs.

In the aspect of synthesized polymer, the synthesized polymer has larger C—C bond energy, and molecular chains do not easily rupture under high-temperature conditions. The polymers currently applied in the hydraulic fracturing of a high-temperature reservoir are mainly the multi-component copolymer taking polyacrylamide as a main chain, and the multi-component copolymer has excellent performance in thickening property, gel breaking property, temperature resistance, and residue damage reduction. CN115074106B discloses a gel fracturing fluid and the preparation method thereof, the gel fracturing fluid comprises a thickening agent, a cross-linking agent, and water, wherein the thickening agent comprises acrylamide, a sulfonic acid monomer, a promoting monomer, a reinforcing monomer, 1-isopropenyl-2-benzimidazolone, wherein the promoting monomer is vinyl tri (dimethyl siloxane) silane and/or allyloxy-tert-butyl-dimethyl silane, and the reinforcing monomer is 2-(di-isopropylamino) ethyl methacrylate and/or 2-carbonyl-tetrahydrofuran-3-hydroxy-methacrylate. The thickening agent is a five-membered copolymer or even a seven-membered copolymer, and the structure is excessively complex. CN114621743A discloses a slow-crosslinking temperature-resistant and salt-tolerant polymer gel fracturing fluid and preparation method and use thereof, the fracturing fluid comprises a polymer thickening agent, a crosslinking agent, a gel breaker, a cleanup additive, a clay stabilizer, and water, wherein the thickening agent is a quadripolymer synthesized by acrylamide, acrylic acid, 2-acrylamido-2-methylpropanesulfonic acid and vinyl imidazole, the thickening agent has the retained viscosity of about 50 mPa·s under the addition amount of 0.6% and shearing for 2 h under the shearing rate of 170 s$^{-1}$ and the temperature of 160° C.

The gel fracturing fluid taking the synthetic multicomponent copolymer as the thickener is the main approach for dealing with the ultrahigh-temperature reservoir stratum fracturing in China and foreign countries, and the high-strength gel mainly constructed by means of high-concentration thickener and a cross-linking agent is used for dealing with the ultrahigh-temperature challenge, but it brings about the problems such as difficult gel breaking, low flow back rate, high reservoir damage, and difficult cost control.

The research and development of the ultra-high temperature resistant thickener is a fundamental problem for realizing the efficient development of the ultra-deep layer oil and gas reservoir. In order to meet the requirements of temperature resistance and shear resistance of the ultra-deep layer fracturing fluid, synthetic polymers are generally designed with a complex molecular structure formed by copolymerization of multi-functional monomers and multi-functional groups, such as five-membered or even seven-membered copolymers. The complicated molecular structure is not favorable for the industrial scale-up production of the thickener, thus the thickener has defects such as low yield, high costs, and poor quality stability.

SUMMARY

The present disclosure aims to overcome the defects of limited temperature resistance and complex structure of a synthetic polymer thickener when the gel fracturing fluid is applied in the fracturing process of an ultra-deep layer oil and gas reservoir in the existing art, and provides a mussel biomimetic heat-resistant and salt-tolerant thickener, a preparation method thereof, a gel fracturing fluid and a preparation method thereof and use thereof, the gel fracturing fluid has a covalent-non covalent multiple polymer network, which exhibits excellent heat-resistance and salt-tolerance and shear recoverability compared with a single chemical crosslinking system.

To achieve the above objects, the first aspect of the present disclosure provides a mussel biomimetic heat-resistant and salt-tolerant thickener, wherein the thickener comprises structural units represented by formulae (a) to (f);

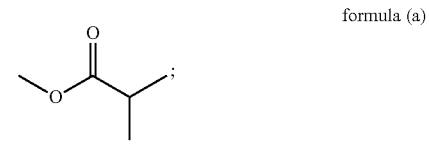

formula (a)

formula (b)

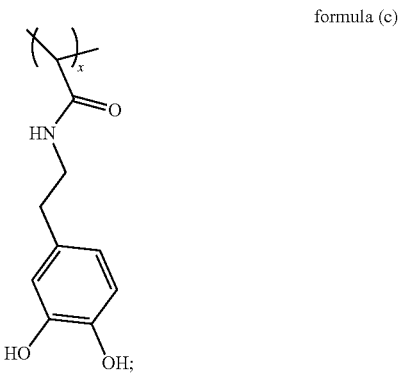

formula (c)

formula (d)

formula (e)

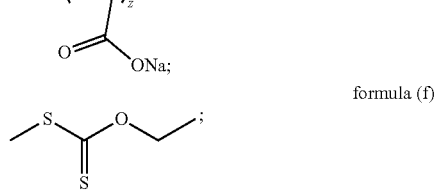

formula (f)

wherein m is within the range of 52-63, x is within the range of 2-7, y is within the range of 4-12, and z is within the range of 8-16.

In the second aspect, the present disclosure provides a method for preparing the aforementioned mussel biomimetic heat-resistant and salt-tolerant thickener comprising:

(1) contacting acrylamide, sodium acrylate, 2-acrylamide-2-methylpropanesulfonic acid, 3-acrylamide dopamine with water to perform a reversible addition-cracking chain transfer polymerization reaction to obtain a first reaction system in the presence of a water-soluble macromolecular chain transfer agent xanthate ester;

(2) contacting the first reaction system with an initiator to carry out a heating reaction to obtain a second reaction system under the condition of the water bath;

(3) rinsing and vacuum drying the second reaction system to prepare a mussel biomimetic heat-resistant and salt-tolerant thickener.

In the third aspect, the present disclosure provides a mussel biomimetic heat-resistant and salt-tolerant thickener prepared with the aforementioned method.

In the fourth aspect, the present disclosure provides a method for preparing a gel fracturing fluid comprising:

S201: contacting a mussel biomimetic heat-resistant and salt-tolerant thickener with water to obtain a reaction system S201; wherein the mussel biomimetic heat-resistant and salt-tolerant thickener is the aforementioned mussel biomimetic heat-resistant and salt-tolerant thickener;

S202: contacting the reaction system S201 with a crosslinking agent for performing the dissolution and aging reaction to prepare the gel fracturing fluid under a stirring condition.

In the fifth aspect, the present disclosure provides a gel fracturing fluid prepared with the aforementioned method.

In the sixth aspect, the present disclosure provides a method of using the aforementioned gel fracturing fluid in the fracturing development of the deep/ultra-deep layer oil and gas reservoirs.

Due to the technical scheme, the present disclosure produces the favorable effects as follows:

(1) the mussel biomimetic heat-resistant and salt-tolerant thickener prepared by the present disclosure is a four-membered copolymer of a mussel biomimetic catechol monomer (3-acrylamide dopamine), a sulfonate monomer, acrylamide, and sodium acrylate, and a RAFT (reversible addition-fragmentation chain transfer) controllable polymerization method is adopted, so that the polymerization reaction condition is mild, and the product property is stable.

(2) The mussel biomimetic catechol monomer contains abundant phenolic hydroxyl groups and ring groups, and can implement the multiple non-covalent supramolecular interactions such as π-π accumulation, Michael addition, cation-π, and hydrogen bonds; the sulfonic group with strong polarity can improve tolerance of the polymer to the salt concentration in water; acrylamide and sodium acrylate provide rich crosslinking groups (amide groups and carboxyl groups), can be chemically cross-linked with transition nonmetal crosslinking agents (borax and organic boron), transition metal crosslinking agents (chromium trichloride, titanium tetrachloride, zirconium oxychloride, organic zirconium, organic titanium and the like) and high-molecular crosslinking agents (polyethylene imine and phenolic resin), the crosslinking groups are rich, thus the crosslinking agents can be purposefully selected to realize rapid gelling in a wide temperature range according to different development mode requirements; the prepared supramolecular enhanced gel can be extended to various actual oilfield development uses, and has great use potential in dealing with the high-temperature reservoir stratum fracturing, gel water plugging/sealing gas channeling, foaming and foam stabilization, and other aspects.

(3) The supramolecular interaction enhanced gel fracturing fluid preparation method proposed by the present disclosure has a non-covalent-covalent composite network structure. Wherein the mussel biomimetic catechol monomer provides a multiple supramolecular interaction to construct a non-covalent polymer network, and the covalent polymer network structure is formed by chemically cross-linking the amide group and carboxyl group crosslinking sites provided by an acrylamide monomer and a sodium acrylate monomer with a crosslinking agent. The two kinds of polymer network structures exist in the constructed supramolecular interaction reinforced gel fluid at the same time, when compared with the gel fracturing fluid prepared by the single chemical crosslinking, the gel fracturing fluid has the advantages of temperature resistance, shear resistance, and salt resistance. The zirconium gel fracturing fluid prepared from tap water and 0.6% of thickener has a retained viscosity of about 85.7 mPa·s after shearing for 2 h under the shearing rate of 170 $s^{-1}$ and the temperature of 200° C., and the recovery rate of the viscosity after the rupturing and shearing reaches 92.1%.

(4) The supramolecular interaction enhanced gel fracturing fluid is suitable for deep/ultra-deep layer oil and gas reservoir development and provides a solution and a reference idea for further improving the technology of efficiently developing fracturing fluid for deep/ultra-deep layer oil and gas in China.

BRIEF DESCRIPTION OF THE DRAWINGS

FIG. 1 is a flow chart of the method for preparing the mussel biomimetic heat-resistant and salt-tolerant thickener (p[AM-AANa-DOPA-AMPS]);

FIG. 2 is a flow chart of the method for preparing the supramolecular interaction enhanced gel fracturing fluid provided by the present disclosure;

DETAILED DESCRIPTION

Figure 3:
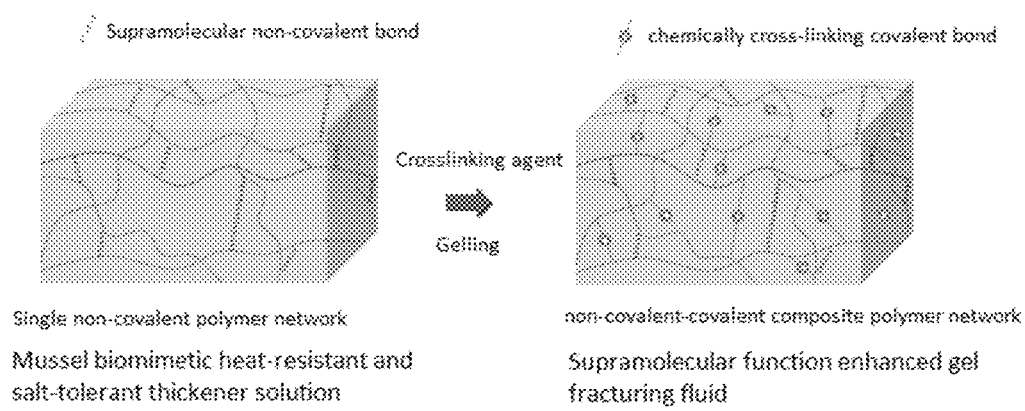
FIG. 3 is a schematic diagram of a covalent-non-covalent composite polymer network of a supramolecular interaction enhanced gel fracturing fluid provided by the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

As previously mentioned, the first aspect of the present disclosure provides a mussel biomimetic heat-resistant and salt-tolerant thickener, wherein the thickener comprises structural units represented by formulae (a) to (f);

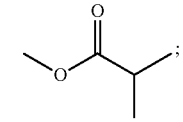
formula (a)

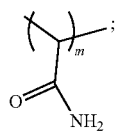
formula (b)

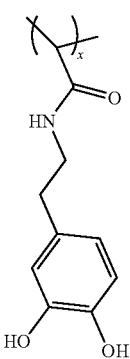
formula (c)

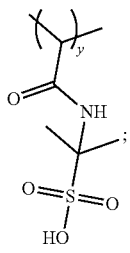
formula (d)

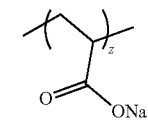
formula (e)

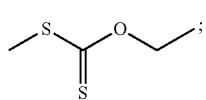
formula (f)

wherein m is within the range of 52-63, x is within the range of 2-7, y is within the range of 4-12, and z is within the range of 8-16.

According to the present disclosure, in a case of preferably, m is within the range of 58-63, x is within the range of 4-7, y is within the range of 5-10, and z is within the range of 8-10; more preferably, m is within the range of 60-63, x is within the range of 4-7, y is within the range of 6-10, and z is within the range of 8-10.

According to the present disclosure, the thickener preferably has a structure represented by formula (1);

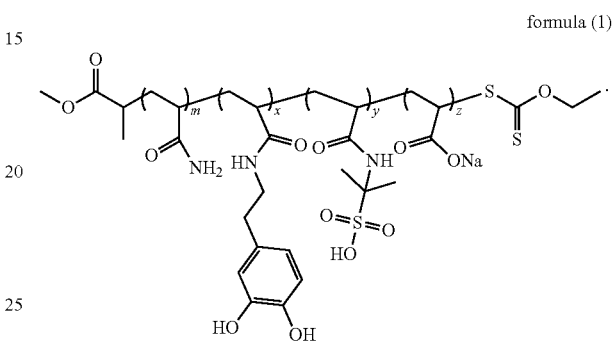
formula (1)

The inventors of the present disclosure have proposed a mussel biomimetic heat-resistant and salt-tolerant thickener suitable for deep/ultra-deep layer oil and gas fracturing development based on the mussel biomimetic idea, and the main process is as follows: taking acrylic anhydride and dopamine hydrochloride (DOPA) as reaction raw materials, synthesizing a mussel biomimetic catechol monomer (3-acrylamido dopamine, AM-DOPA) containing both an addible ethylene group and a mussel biomimetic catechol (catechol) group; using 2-bromomethyl propionate, potassium ethylxanthate and acrylamide as reaction raw materials, and using 4,4'-azobis(4-cyanovaleric acid) as an initiator, synthesizing a water-soluble macromolecular chain transfer agent xanthate ester (PAM-X) for reversible addition-fragmentation chain transfer (RAFT) polymerization reaction; using acrylamide (AM), sodium acrylate (AANa), 3-acrylamide dopamine (AM-DOPA) and 3-acrylamide-2-methylpropanesulfonic acid (AMPS) as reaction raw materials, a chain transfer agent is synthesized water-soluble xanthate ester (PAM-X), an initiator is azobisisobutyramidine hydrochloride (AIBA), and using a RAFT active/controllable polymerization method for synthesizing the mussel biomimetic heat-resistant and salt-tolerant thickener. The present disclosure simulates that the byssus protein secreted by the marine organism mussels can firmly adhere to the rock surface in a seawater environment, the byssus also has excellent self-repairing performance; the mussel biomimetic catechol monomer supplied by the present disclosure provides a multiple supramolecular interaction to construct a non-covalent polymer network, and the covalent polymer network structure is formed by chemically crosslinking the amide group and carboxyl group crosslinking sites provided by an acrylamide monomer and a sodium acrylate monomer with a crosslinking agent. As a result, the supramolecular interaction enhanced gel fracturing fluid prepared by the present disclosure has a non-covalent-covalent composite network structure.

Further, the inventors of the present disclosure have discovered that the thickener is characterized by the four-membered copolymer containing mussel biomimetic catechol monomer, sulfonate monomer, acrylamide, and sodium acrylate. The byssus protein secreted by the marine organism mussels can be firmly adhered to the rock surface in a seawater environment, the byssus also has excellent self-repairing performance, which is mainly attributed to the multiple supramolecular interaction of a catechol-like structure.

Furthermore, the inventors of the present disclosure have discovered that the mussel biomimetic catechol monomer contains abundant phenolic hydroxyl groups and ring groups, and can implement multiple non-covalent supramolecular interactions such as π-π accumulation, Michael addition, cation-π, and hydrogen bonds, so that a polymer chain can form a non-covalent polymer network structure through the non-covalent actions under the condition of lacking a crosslinking agent. The sulfonate monomer is a branched anionic side group, has a certain rigid structure that can effectively prevent the chain curling behavior of the polymer under the high temperature, and it contains a strongly polar sulfonic group that can improve the tolerance of the polymer to salt concentration in water. Acrylamide acts as a backbone thickening monomer, and also provides crosslinking site amide groups. Sodium acrylate is very easy to form anionic sodium acrylate in an aqueous solution, which can increase the water solubility of the polymer and provide the crosslinking site carboxyl groups.

Still further, the inventors of the present disclosure have discovered that the mussel biomimetic heat-resistant and salt-tolerant thickener comprises a large amount of crosslinking site amide groups and carboxyl groups, and can be chemically cross-linked with transition nonmetal crosslinking agents (borax and organic boron), transition metal crosslinking agents (chromium trichloride, titanium tetrachloride, zirconium oxychloride, organic zirconium, organic titanium and the like) and high-molecular crosslinking agents (polyethylene imine and phenolic resin), in order to form a covalent polymer network structure.

According to the present disclosure, the non-covalent supramolecular interaction force provided by the mussel biomimetic catechol monomers in the mussel biomimetic heat-resistant and salt-tolerant thickener provided by the present disclosure are as follows:

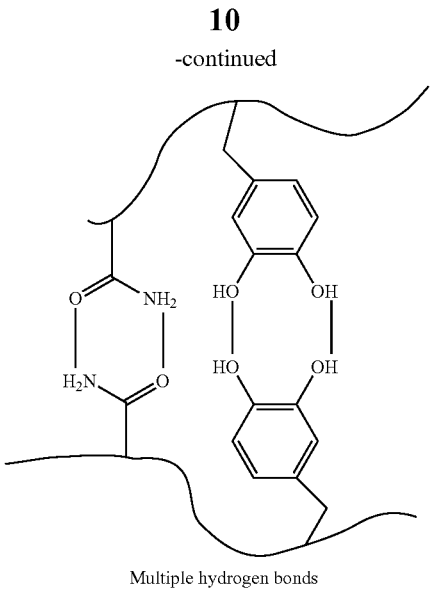

Multiple hydrogen bonds

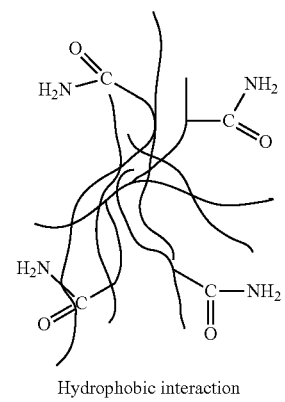

Hydrophobic interaction

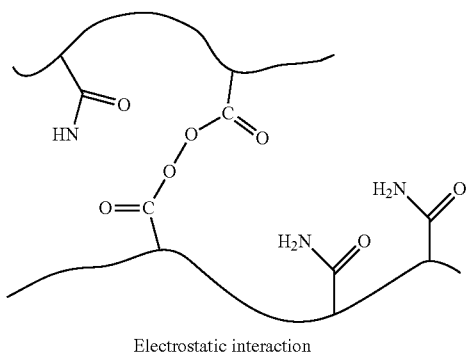

Electrostatic interaction

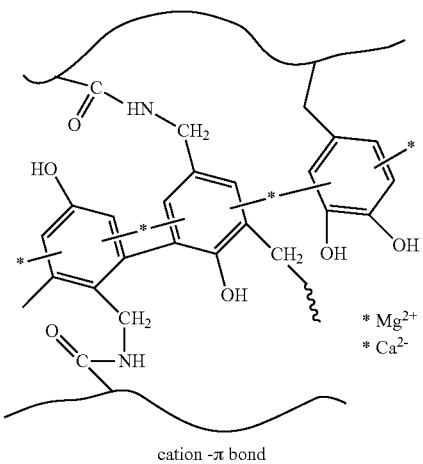

cation -π bond

-continued

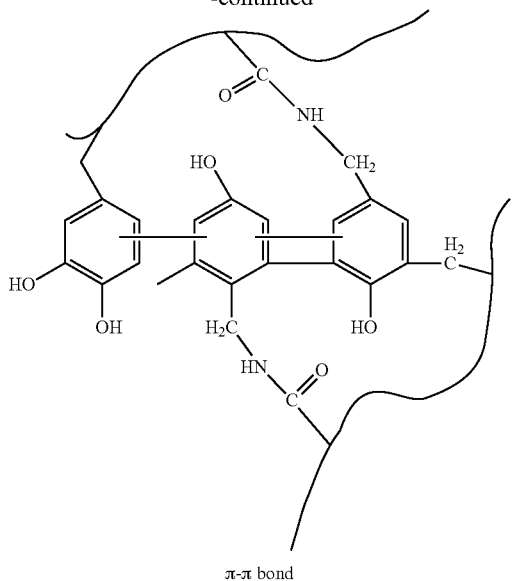

π-π bond

As previously mentioned, the mussel biomimetic catechol monomer contains abundant phenolic hydroxyl groups and ring groups and can implement multiple non-covalent supramolecular interactions such as π-π accumulation, Michael addition, cation-π, and hydrogen bonds, so that a polymer chain can form a non-covalent polymer network structure through the non-covalent actions under the condition of lacking a crosslinking agent. The sulfonate monomer is 2-acrylamide-2-methylpropanesulfonic acid that acts as a branched anion side group, has a certain rigid structure that can effectively prevent the chain curling behavior of the polymer under high temperature, and it contains a strongly polar sulfonic group that can improve the tolerance of the polymer to the salt concentration in water. Acrylamide acts as a backbone thickening monomer, and also provides crosslinking site amide groups. Sodium acrylate is very easy to form anionic sodium acrylate in an aqueous solution, which can increase the water solubility of the polymer and provide the crosslinking site carboxyl groups.

In the second aspect, the present disclosure provides a method for preparing the aforementioned mussel biomimetic heat-resistant and salt-tolerant thickener comprising:
(1) contacting acrylamide, sodium acrylate, 2-acrylamide-2-methylpropanesulfonic acid, 3-acrylamide dopamine with water to perform a reversible addition-cracking chain transfer polymerization reaction to obtain a first reaction system in the presence of a water-soluble macromolecular chain transfer agent xanthate ester;
(2) contacting the first reaction system with an initiator to carry out a heating reaction to obtain a second reaction system under the condition of the water bath;
(3) rinsing and vacuum drying the second reaction system to prepare a mussel biomimetic heat-resistant and salt-tolerant thickener.

The inventors of the present disclosure have found that: the mussel biomimetic catechol monomer (AM-DOPA) provides a multiple supramolecular interaction to construct a non-covalent polymer network, and the covalent polymer network structure is formed by chemically crosslinking the amide group and carboxyl group crosslinking sites provided by an acrylamide monomer (AM) and a sodium acrylate monomer (AANa) with a crosslinking agent. The two kinds of polymer network structures exist in the constructed supramolecular interaction enhanced gel fracturing fluid at the same time, when compared with the gel fracturing fluid prepared through the single chemical crosslinking, the supramolecular interaction enhanced gel fracturing fluid has the advantages of temperature resistance, shear resistance, and salt tolerance.

In the present disclosure, Acrylamide (AM), sodium acrylate (AANa), 3-acrylamide dopamine (AM-DOPA) and 2-acrylamide-2-methylpropanesulfonic Acid (AMPS) are used as reaction raw materials, a chain transfer agent is synthesized water-soluble xanthate ester (PAM-X), an initiator is an azobisisobutyramidine hydrochloride (AIBA), and a RAFT active/controllable polymerization method is used for synthesizing the mussel biomimetic heat-resistor and salt-tolerant thickener.

According to the present disclosure, the RAFT active/controllable polymerization method applies to a wide range of monomers, especially acrylamide monomers; can avoid the use of heavy metal catalysts, and reduce the pollution; the polymerization reaction conditions are mild, and the common temperature range is met; the chain transfer agent is an important regulator in RAFT active/controllable polymerization, the commonly used types of the chain transfer agent comprise: dithioesters, trithiocarbonates, dithiocarbamates, xanthate esters and the like; preferably, the xanthate ester has the advantages of little odor, low toxicity, simple and exsiting synthesis method and wide application range of monomers; more preferably, the chain transfer agent xanthate ester (PAM-X) is selected and used.

According to the present disclosure, the sodium acrylate in step (1) is a sodium acrylate and/or a potassium acrylate, preferably a sodium acrylate (AANa). In the present disclosure, acrylic acid and sodium hydroxide solution may be used for preparing an aqueous sodium acrylate (AANa) solution.

According to the present disclosure, in step (1), acrylamide (AM), aqueous sodium acrylate solution, 3-acrylamido dopamine (AM-DOPA), 2-acrylamide-2-methylpropanesulfonic acid (AMPS) and a chain transfer agent (PAM-X) are added into the aqueous solution according to a certain molar ratio, the mixture is dissolved by magnetic stirring, nitrogen gas is introduced to remove oxygen for 30-60 min, to obtain a first reaction system; wherein the solution concentration of the monomer solution in the first reaction system is within the range of 30-40 wt %.

According to the present disclosure, the molar ratio of the used amount of acrylamide (AM), sodium acrylate, 2-acrylamido-2-methylpropanesulfonic acid (AMPS), and 3-acrylamidodopamine (AM-DOPA) is within the range of (63-75):(3-8):(5-15):(10-20), preferably within the range of (65-73):(5-8):(5-15):(15-20).

According to the present disclosure, the mass ratio of the used amount of the chain transfer agent to the initiator is within the range of (0.05-0.2):(0.3-0.5).

According to the present disclosure, in step (2), an initiator is added to the first reaction system, and a second reaction system is obtained after a water bath heating reaction; wherein the initiator is azobisisobutyramidine hydrochloride (AIBA).

According to the present disclosure, the conditions of the water bath heating in step (2) comprise: the temperature within the range of 45-60° C., and the time within the range of 4-6 h.

According to the present disclosure, the temperature of the vacuum drying in step (3) is within the range of 50-60° C., preferably, the temperature of the vacuum drying is 50° C.

According to the present disclosure, a muscle biomimetic catechol monomer 3-acrylamidodopamine (AM-DOPA) can be homemade, and in the present disclosure, a method of preparing the 3-acrylamidodopamine (AM-DOPA) comprising:

(a) contacting and dissolving sodium tetraborate decahydrate and methanol to obtain a reaction system a;

(b) under the protection of nitrogen gas, contacting dopamine hydrochloride with the reaction system a, after the dopamine hydrochloride is completely dissolved, adjusting the solution to be alkalescent by using sodium carbonate to obtain a reaction system b;

(c) dropwise adding acrylic anhydride into the reaction system b for carrying out a reaction, and after the reaction is finished, adjusting the solution to be acidic by using hydrochloric acid to obtain a reaction system c;

(d) carrying out vacuum rotary evaporation on the reaction system c to remove the solvent, and then performing vacuum oven drying treatment to prepare the 3-acrylamide dopamine.

According to the present disclosure, the molar ratio of the used amount of the sodium tetraborate decahydrate, the dopamine hydrochloride, and the acrylic anhydride is within the range of (2-4):(2-4):(1-2).

According to the present disclosure, in step (a), sodium tetraborate decahydrate is dissolved in methanol and is magnetically stirred for 20-40 min in a nitrogen gas atmosphere such that the sodium tetraborate decahydrate is fully dissolved, to obtain the reaction system a.

According to the present disclosure, in step (b), nitrogen gas is continuously introduced, and dopamine hydrochloride is added into the first reaction system, after dopamine hydrochloride is completely dissolved under the continuous magnetic stirring condition, sodium carbonate is used for adjusting the solution to be alkalescent, wherein the pH of the alkalescent solution is within the range of 9.5-10.5, to obtain a reaction system b. In addition, dopamine hydrochloride provides mussel biomimetic key functional groups: the catechol structure, which is represented by the chemical structural formula as follows:

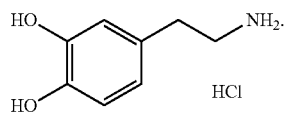

According to the present disclosure, in step (c), continuously introducing nitrogen gas, slowly and dropwise adding acrylic anhydride into the second reaction system, carrying out the reaction for 12-24 hours under continuous weak magnetic stirring conditions, after the reaction is finished, adjusting the solution to be acidic by using hydrochloric acid to obtain a reaction system c; wherein the reaction temperature is within the range of 20-35° C.; the acidic pH is within the range of 1.5-2.

According to the present disclosure, in step (d), after the solvent is removed by carrying out vacuum rotary evaporation on the reaction system c, vacuum oven drying is then performed, such that the mussel biomimetic catechol monomer (3-acrylamidodopamine, AM-DOPA) containing both the addible ethylene group and the mussel biomimetic catechol (catechol) group is obtained.

In the present disclosure, the vacuum rotary evaporation temperature is within the range of 50-60° C., preferably 50° C.; the vacuum oven drying temperature is within the range of 50-60° C., and preferably 50° C.

According to the present disclosure, the chain transfer agent is represented by the general formula shown in formula (2):

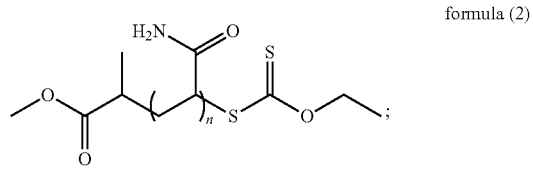

formula (2)

wherein n is within the range of 5-10.

According to the present disclosure, the chain transfer agent is a synthetic water-soluble xanthate ester (PAM-X) which can be homemade, and in the present disclosure, the method of preparing the chain transfer agent (PAM-X) comprising:

(e) contacting 2-bromomethyl propionate with methanol and dissolving 2-bromomethyl propionate, then cooling the mixture in an ice-water bath to obtain a reaction system e;

(f) contacting the reaction system e with potassium ethylxanthate for carrying out a reaction to obtain a reaction system f, (g) subjecting the reaction system f to a vacuum rotary evaporation to remove the solvent, and then carrying out a vacuum oven drying treatment to obtain an intermediate product X;

(h) under the protection of nitrogen gas, contacting the intermediate product X, acrylamide, and ethanol with water to obtain a reaction system h;

(i) under the condition of the water bath, contacting the reaction system h with an initiator for performing a heating reaction to obtain a reaction system i;

(j) subjecting the reaction system i to a vacuum rotary evaporation to remove the solvent, and then performing a vacuum oven drying treatment to prepare the chain transfer agent.

In the present disclosure, 2-bromomethyl propionate, potassium ethylxanthate, and acrylamide are used as reaction raw materials, 4,4'-azobis(4-cyanovaleric acid) is used as an initiator, such that a water-soluble macromolecular chain transfer agent xanthate ester (PAM-X) for reversible addition-fragmentation chain transfer polymerization (RAFT) is synthesized.

According to the present disclosure, in step (e), 2-bromomethyl propionate is dissolved in methanol through magnetic stirring, and a flask containing the solution is placed in an ice-water bath for cooling to obtain a reaction system e; wherein the molar ratio of the used amount of the 2-bromomethyl propionate to the potassium ethylxanthate is within the range of (4-6):(5-7); the temperature of the ice-water bath is from −6° C. to −2° C.

According to the present disclosure, in step (f), potassium ethylxanthate is slowly added into the reaction system e, after the addition is completed, the reaction system is moved to the temperature condition of 25-30° C. for carrying out a reaction for 12-20 h, after the reaction is finished, a reaction system f is obtained.

According to the present disclosure, in step (g), after the reaction system f is subjected to vacuum rotary evaporation to remove the solvent, a vacuum oven drying treatment is carried out to obtain an intermediate product X; wherein the molar ratio of the used amount of the intermediate product X to acrylamide is within the range of (1-2):(5-10).

According to the present disclosure, in step (h), the intermediate product X and acrylamide are added into a mixture of ethanol/water (volume ratio is 1:1), nitrogen gas is introduced to remove oxygen gas for 30-60 min, and a reaction system h is obtained.

According to the present disclosure, in step (i), adding an initiator 4,4'-azobis(4-cyanovaleric acid) into the reaction system h, and performing the water bath heating reaction to obtain a reaction system i; wherein the initiator is 4,4'-azobis (4-cyanovaleric acid); and the initiator is used in an amount of 0.05-0.2 wt % based on the total weight of the 2-bromomethyl propionate and the potassium ethylxanthate.

According to the present disclosure, the reaction temperature in step (i) is within the range of 50-70° C., and the reaction time is within the range of 2-4 h.

According to the present disclosure, in step (j), after the reaction system i is subjected to vacuum rotary evaporation to remove the solvent, a vacuum oven drying treatment is carried out, and the water-soluble macromolecular chain transfer agent xanthate ester (PAM-X) is obtained. In the present disclosure, the vacuum rotary evaporation temperature is within the range of 50-60° C., preferably 50° C.; the vacuum oven drying temperature is within the range of 50-60° C., preferably 50° C.

According to a preferred embodiment of the present disclosure, the synthesis route of the mussel biomimetic heat-resistant and salt-tolerant thickener (p[AM-AANa-DOPA-AMPS]) is as follows:

(1) mussel biomimetic catechol monomer (3-acrylamido dopamine, AM-DOPA)

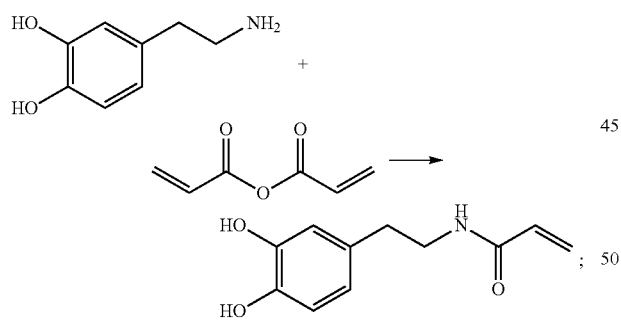

(2) water-soluble macromolecular chain transfer agent Xanthate ester (PAM-X)

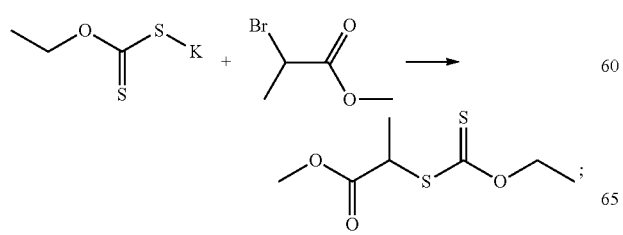

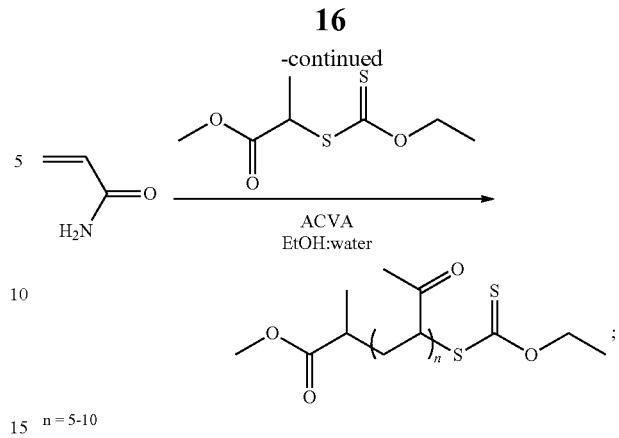

n = 5-10

(3) mussel biomimetic heat-resistant and salt-tolerant thickener (p[AM-AANa-DOPA-AMPS])

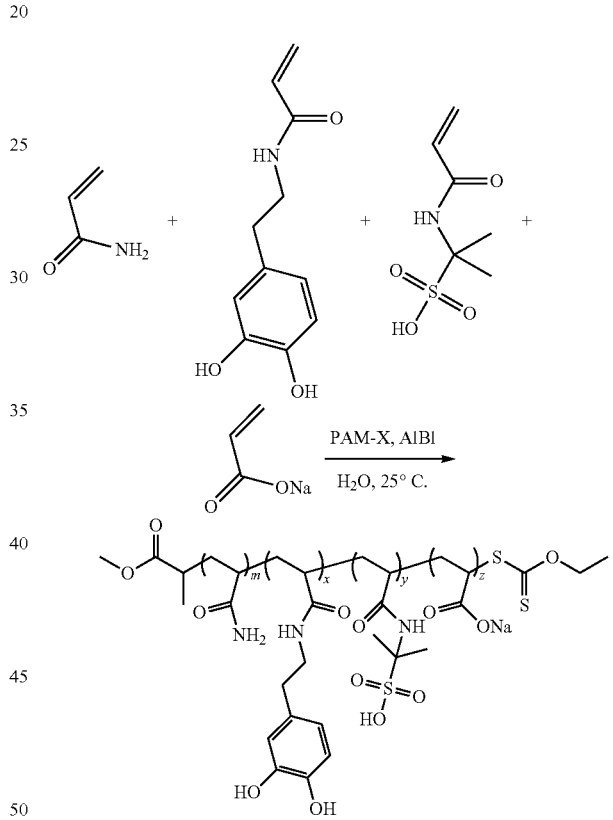

It should be noted that the acrylamide in step (2) is acrylamide in PAM-X, it has a low content and is used for chain transfer and termination; it is not the acrylamide backbone in the copolymer.

FIG. 1 is a flow chart of the method for preparing the mussel biomimetic heat-resistant and salt-tolerant thickener (p[AM-AANa-DOPA-AMPS]), specifically, the method comprising:

S101: taking acrylic anhydride and dopamine hydrochloride (DOPA) as reaction raw materials, synthesizing a mussel biomimetic catechol monomer (3-acrylamido dopamine, AM-DOPA) containing both an addible ethylene group and a mussel biomimetic catechol (catechol) group;

S102: using 2-bromomethyl propionate, potassium ethylxanthate and acrylamide as reaction raw materials, and using 4,4′-azobis(4-cyanovaleric acid) as an initiator, synthesizing a water-soluble macromolecular chain transfer agent xanthate ester (PAM-X) for reversible addition-fragmentation chain transfer (RAFT) polymerization reaction;

S103: using acrylamide (AM), sodium acrylate (AANa), 2-acrylamide-2-methylpropanesulfonic Acid (AMPS), and 3-acrylamide dopamine (AM-DOPA) as reaction raw materials, and using a RAFT active/controllable polymerization method for synthesizing the mussel biomimetic heat-resistant and salt-tolerant thickener.

In the third aspect, the present disclosure provides a mussel biomimetic heat-resistant and salt-tolerant thickener prepared with the aforementioned method.

The fourth aspect of the present disclosure provides a method for preparing a gel fracturing fluid, and FIG. 2 is a flow chart of the method for preparing the supramolecular interaction enhanced gel fracturing fluid provided by Examples of the present disclosure; wherein the method comprising:

S201: contacting a mussel biomimetic heat-resistant and salt-tolerant thickener with water to obtain a reaction system S201; wherein the mussel biomimetic heat-resistant and salt-tolerant thickener is the aforementioned mussel biomimetic heat-resistant and salt-tolerant thickener;

S202: under the stirring condition, contacting the reaction system S201 with a cross-linking agent for performing the dissolution and aging reaction to prepare the gel fracturing fluid.

According to the present disclosure, the gel fracturing fluid has a non-covalent-covalent multiple cross-linked polymer composite network structure.

Specifically, the first kind of polymer network structure in the multiple cross-linked polymer composite network structure is based on the mussel biomimetic catechol monomer (AM-DOPA) in the mussel biomimetic heat-resistant and salt-tolerant thickener, and due to the multiple non-covalent supramolecular interactions such as π-π accumulation, Michael addition, cation-r, and hydrogen bonds, the thickener chain can form a non-covalent polymer network structure through the non-covalent action without a cross-linking agent.

Specifically, the second kind of polymer network structure in the multiple cross-linked polymer composite network structure is based on amide and carboxyl cross-linking sites provided by acrylamide monomers and sodium acrylate monomers in a mussel biomimetic heat-resistant and salt-tolerant thickener and forms a covalent polymer network structure through chemically cross-linking with a cross-linking agent.

In particular, the two kinds of polymer network structures simultaneously exist in the constructed supramolecular interaction enhanced gel fracturing fluid.

FIG. 3 is a schematic diagram of a covalent-non-covalent composite polymer network of a supramolecular interaction enhanced gel fracturing fluid provided by the present disclosure; as illustrated in FIG. 3, the first kind of polymer network structure in the multiple cross-linked polymer composite network structure is based on the mussel biomimetic catechol monomer (AM-DOPA) in the mussel biomimetic heat-resistant and salt-tolerant thickener, and due to the multiple non-covalent supramolecular interactions such as π-π accumulation, Michael addition, cation-r, and hydrogen bonds, the thickener chain can form a non-covalent polymer network structure through the non-covalent action without a cross-linking agent; in addition, the second kind of polymer network structure in the multiple cross-linked polymer composite network structure is based on amide and carboxyl cross-linking sites provided by acrylamide monomers and sodium acrylate monomers in a mussel biomimetic heat-resistant and salt-tolerant thickener, and forms a covalent polymer network structure through chemically cross-linking with a cross-linking agent. It shall be noted that the two kinds of polymer network structures simultaneously exist in the constructed supramolecular interaction enhanced gel fracturing fluid.

According to the present disclosure, the cross-linking agent is one or more selected from the group consisting of organic zirconium, organic titanium, borax, organic boron, phenolic resin, and polyethylene imine; preferably, the cross-linking agent is one or more selected from the group consisting of organic zirconium, phenolic resin, and polyethylene imine.

According to the present disclosure, the muscle biomimetic heat-resistant and salt-tolerant thickener provided by the present disclosure is cross-linked with organic zirconium to form bonds as shown in the following figure:

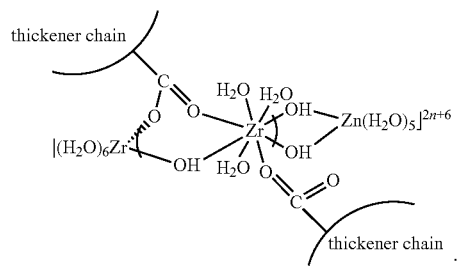

According to the present disclosure, the mass ratio of the used amount of organic zirconium to water is within the range of (5-16):(984-995).

According to the present disclosure, when the cross-linking agent is organic zirconium, the reaction temperature is within the range of 65-80° C.

According to the present disclosure, the mussel biomimetic heat-resistant and salt-tolerant thickener provided by the present disclosure is cross-linked with phenolic resin to form bonds as shown in the following figure:

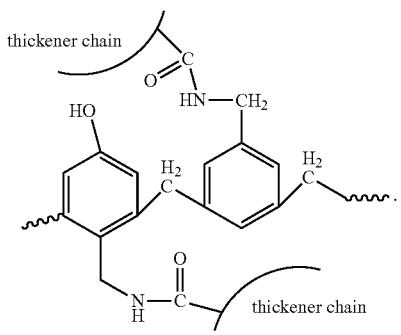

According to the present disclosure, the mass ratio of the used amount of phenolic resin to water is within the range of (15-24):(976-985).

According to the present disclosure, when the cross-linking agent is phenolic resin, the reaction temperature is within the range of 70-90° C.

According to the present disclosure, the mussel biomimetic heat-resistant and salt-tolerant thickener provided by the present disclosure is cross-linked with polyethylene imine to form bonds as shown in the following figure:

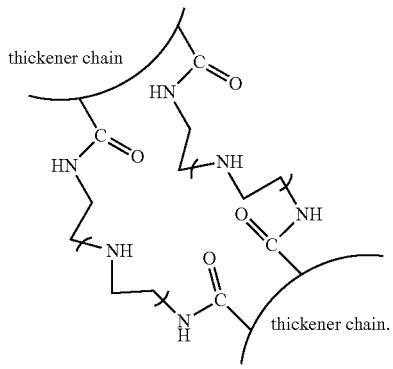

According to the present disclosure, the mass ratio of the used amount of polyethylene imine to water is within the range of (2-10):(990-998).

According to the present disclosure, when the cross-linking agent is polyethylene imine, the reaction temperature is within the range of 120-160° C.

According to the present disclosure, the mass ratio of the used amount of mussel biomimetic heat-resistant and salt-tolerant thickener to water is within the range of (5-8):(992-995).

In the fifth aspect, the present disclosure provides a gel fracturing fluid prepared with the aforementioned method.

According to the present disclosure, the supramolecular interaction enhanced gel fracturing fluid has a multiple polymer network structure comprising a first kind of polymer network structure and a second kind of polymer network structure; wherein the first type of polymer network structure is based on the mussel biomimetic catechol monomer (AM-DOPA) in the mussel biomimetic heat-resistant and salt-tolerant thickener, and due to the multiple non-covalent supramolecular interactions such as π-π accumulation, Michael addition, cation-π, and hydrogen bonds, the thickener chain can form a non-covalent polymer network structure through the non-covalent action without a cross-linking agent; the second kind of polymer network structure is based on amide and carboxyl cross-linking sites provided by acrylamide monomers and sodium acrylate monomers in a mussel biomimetic heat-resistant and salt-tolerant thickener, and forms a covalent polymer network structure through chemically cross-linking with a cross-linking agent. It shall be noted that the two kinds of polymer network structures simultaneously exist in the constructed supramolecular interaction enhanced gel fracturing fluid.

According to the present disclosure, the supermolecular interaction enhanced zirconium gel fracturing fluid prepared from tap water and 0.6% of thickener has a retained viscosity of about 85.7 mPa·s after shearing for 2 h under the shearing rate of 170 s$^{-1}$ and the temperature of 200° C., and the recovery rate of the viscosity after the rupturing and shearing reaches 92.1%.

In the sixth aspect, the present disclosure provides a method of using the aforementioned gel fracturing fluid in the fracturing development of the deep/ultra-deep layer oil and gas reservoirs.

The present disclosure will be described in detail below with reference to examples.

In the following examples:

the rheological properties of the various types of prepared gel fracturing fluids were measured by a high-temperature high-pressure rheometer (HaaKe RS60, commercially available from Thermo Fisher Scientific (China) Co., Ltd.).

wherein the temperature-resistant and shear-resistant experiment specifically comprises the following steps: the shear rate was set to be constant rate of 170 s$^{-1}$, the water-based fracturing fluid was heated to 200° C., and the shear time was set to be 2 h to obtain the viscosity-temperature-time relationship curve, according to the oil & gas industrial standard "Recommended practices on measuring the properties of water-based fracturing fluid" (SY/T 5107-2005) of the People's Republic of China (PRC).

The large strain cycle shear curve was mainly used for measuring the gel viscosity resilience, the test temperature was set to be 25° C., the angular frequency was constant ($\omega$=6.28 rad·s$^{-1}$), the strain scanning test was carried out, the strain variation range was within the range of 1%-5,000%, the two modulus curves can be intersected, the critical breakdown point (the intersection point of G' and G") was determined, one value before and after the critical breakdown point was then taken respectively to carry out multiple cycles of shear strain oscillation scanning, the scanning was continued for 600 s under the high-shear rupture strain and continued for 100 s under the low-shear strain, the elastic modulus recovery rate of the gel was obtained through calculation, the gel viscosity resilience was evaluated, and the supramolecular non-covalent interaction strength was indirectly clarified.

In the synthesis process of mussel biomimetic heat-resistant and salt-tolerant thickener, each of the raw materials dopamine hydrochloride (analytically pure, 97%), sodium tetraborate decahydrate (analytically pure, 97%), acrylic anhydride (analytically pure, 98%), 2-bromomethyl propionate (analytically pure, 98%), potassium ethylxanthate (analytically pure, 98%), acrylamide (analytically pure, 99%), acrylic acid (analytically pure, 99%), 2-acrylamide-2-methylpropanesulfonic acid (analytically pure, 99%), solvent methanol (analytically pure, 99%) was purchased from Shanghai Macklin Biochemical technology Co., Ltd., both of the initiator 4,4'-azobis(4-cyanovaleric acid) (analytically pure, 99%), and azobisisobutyramidine hydrochloride (analytically pure, 99%) were purchased from Sigma Aldrich (Shanghai) Trade Co., Ltd., the water used was laboratory-made deionized water (ULUPURE, UPT-II). All reagents were prepared and used on-site without further purification.

In the supramolecular interaction enhanced gel fracturing fluid process, the mussel biomimetic heat-resistant and salt-tolerant thickener was homemade, water was laboratory tap water, the cross-linking agent organic zirconium was purchased from the Shandong Nuoer Biological Technology Co., Ltd., the phenolic resin was commercially available from Shandong Shida Oilfield Technical Services Co., Ltd., the cross-linking agent polyethylene imine was purchased from Shanghai Aladdin Biochemical Technical Co., Ltd. (analytical pure, 99%, MW 600).

Example 1

The Example served to illustrate the mussel biomimetic heat-resistant and salt-tolerant thickener prepared with the method of the present disclosure.

The first step:

Preparation of a mussel biomimetic heat-resistant and salt-tolerant thickener, as shown in FIG. 1, the present disclosure provided a method for preparing the mussel biomimetic heat-resistant and salt-tolerant thickener, the method included a synthesis method of a mussel biomimetic catechol monomer (AM-DOPA), a synthesis method of a water-soluble macromolecular chain transfer agent (PAM-X), a synthesis method of Acrylamide (AM)/sodium acrylate (AANa)/mussel biomimetic catechol monomer (AM-DOPA)/sulfonate monomer (AMPS) four-membered copolymer, and the synthesis route was specifically as follows:

the preparation of mussel biomimetic catechol monomer (AM-DOPA), specifically, the synthesis method included the following steps:

(a) 0.1 mol of sodium tetraborate decahydrate was initially dissolved in 50 mL of methanol, magnetically stirred, nitrogen gas ($N_2$) was introduced for removing oxygen gas for 20 min, such that the sodium tetraborate decahydrate was fully dissolved to obtain a reaction system a;

(b) nitrogen gas was continuously introduced, 0.1 mol of dopamine hydrochloride was added into the reaction system a, and then continuously stirred by magnetic force until the dopamine hydrochloride was completely dissolved, the solution was adjusted to be alkalescent (pH=10) by using sodium carbonate, a reaction system b was obtained;

(c) nitrogen gas was continuously introduced, 0.05 mol of acrylic anhydride was slowly and dropwise added into the reaction system b, and the reaction was performed at room temperature for 24 hours under the continuous weak magnetic stirring condition, after the reaction was finished, the solution was adjusted to be acidic (pH=2) by using hydrochloric acid to obtain a reaction system c.

(d) the reaction system c was subjected to the vacuum rotary evaporation at 50° C. to remove the solvent, and then subjected to the vacuum oven drying treatment at 50° C. to obtain the mussel biomimetic catechol monomer (3-acrylamide dopamine, AM-DOPA) containing both the addible ethylene group and the mussel biomimetic catechol (catechol) group.

The second step:

Preparation of a water-soluble macromolecular chain transfer agent (PAM-X), specifically, the synthesis method included the following steps:

(e) 0.05 mol of 2-bromomethyl propionate was dissolved in 30 mL of methanol by magnetic stirring, and a flask containing the solution was placed in an ice-water bath at the temperature of −5° C. for cooling, a reaction system e was obtained;

(f) 0.06 mol of potassium ethylxanthate was slowly added into the reaction system e, after the addition was finished, the mixture was moved to the temperature of 25° C. and carried out the reacting for 20 h, after the reaction was finished, a reaction system f was obtained;

(g) the reaction system f was subjected to vacuum rotary evaporation at 50° C. to remove the solvent, then subjected to the vacuum oven drying treatment at 50° C. to obtain an intermediate product X;

(h) 1 mol of the intermediate product X and 8 mol of acrylamide were added into a mixture of ethanol/water (volume ratio was 1:1), nitrogen gas was introduced to remove oxygen gas for 40 min, a reaction system h was obtained;

(i) an initiator 4,4′-azobis(4-cyanovaleric acid) with a mass concentration of 0.1% was added into the reaction system h, and subjected to a water bath heating at 60° C. and reaction for 3 h to obtain a reaction system i;

(j) the reaction system i was subjected to vacuum rotary evaporation at 50° C. to remove the solvent, then subjected to vacuum oven drying treatment at 50° C. to obtain the water-soluble macromolecular chain transfer agent xanthate ester (PAM-X); wherein the chain transfer agent had a structure represented by formula (2);

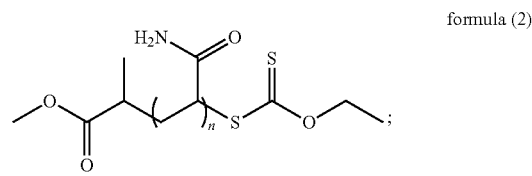

formula (2)

wherein n was 8.

The third step:

In preparation of a mussel biomimetic heat-resistant and salt-tolerant thickener (p[AM-AANa-DOPA-AMPS]), the preparation method specifically included the following steps:

(1) sodium hydroxide solution with a concentration of 1.0 mol·$L^{-1}$ and acrylic acid were blended to form an aqueous sodium acrylate (AANa) solution;

(2) Acrylamide (AM), sodium acrylate (AANa), 3-acrylamido dopamine (AM-DOPA), and 2-acrylamide-2-methylpropanesulfonic Acid (AMPS) were added into the aqueous solution according to the molar ratio of AM:AANa:DOPA:AMPS=73:5:7:15, and a chain transfer agent (PAM-X) with the mass concentration of 0.45% was added into the aqueous solution, wherein the solution concentration was 30%, the materials were dissolved by magnetically stirring, nitrogen gas was introduced to remove oxygen gas for 40 min to obtain a first reaction system;

(3) an initiator azobisisobutylamidine hydrochloride (AIBA) with a mass concentration of 0.1% was added into the first reaction system, it was subjected to the water bath heating at 50° C. and reaction for 6 hours to obtain a second reaction system;

(4) the absolute ethyl alcohol was used for repeatedly cleaning the second reaction system, and the system was subjected to vacuum drying treatment at 50° C. to obtain a mussel biomimetic heat-resistant and salt-tolerant thickener (p[AM-AANa-DOPA-AMPS]), which was labeled as S1.

In addition, the prepared mussel biomimetic heat-resistant and salt-tolerant thickener S1 had a general formula shown in formula (1):

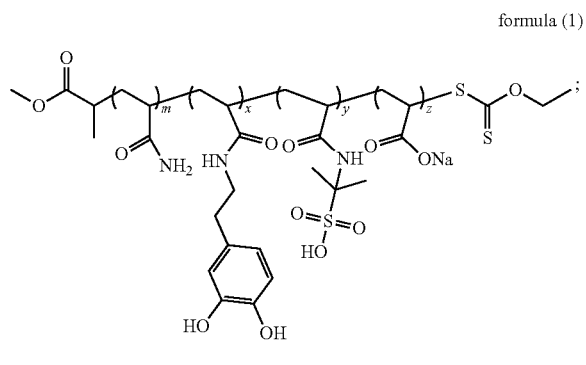

formula (1)

in the formula (1), m was 63, x was 7, y was 10, and z was 8.

Example 2

The Example served to illustrate the mussel biomimetic heat-resistant and salt-tolerant thickener prepared with the method of the present disclosure.

The differences between the mussel biomimetic heat-resistant and salt-tolerant thickener used in the Example and the polymer S1 in Example 1 resided in that the ratio of the functional monomers was changed, and the percentage of the mussel biomimetic supramolecular interaction was further improved, specifically:

(1) sodium hydroxide solution with a concentration of 1.0 mol·L$^{-1}$ and acrylic acid were blended to form an aqueous sodium acrylate (AANa) solution;

(2) Acrylamide (AM), sodium acrylate (AANa), 3-acrylamido dopamine (AM-DOPA), and 2-acrylamide-2-methylpropanesulfonic Acid (AMPS) were added into the aqueous solution according to the molar ratio of AM:AANa:DOPA:AMPS=65:5:15:15, and a chain transfer agent (PAM-X) with the mass concentration of 0.45% was added into the aqueous solution, wherein the solution concentration was 30%, the materials were dissolved by magnetically stirring, nitrogen gas was introduced to remove oxygen gas for 40 min to obtain a first reaction system;

(3) an initiator azobisisobutylamidine hydrochloride (AIBA) with a mass concentration of 0.1% was added into the first reaction system, it was subjected to the water bath heating at 50° C. and reaction for 6 hours to obtain a second reaction system;

(4) the absolute ethyl alcohol was used for repeatedly cleaning the second reaction system, and the system was subjected to vacuum drying treatment at 50° C. to obtain a mussel biomimetic heat-resistant and salt-tolerant thickener (p[AM-AANa-DOPA-AMPS]), which was labeled as S2.

In addition, the prepared mussel biomimetic heat-resistant and salt-tolerant thickener S2 had a general formula shown in formula (1):

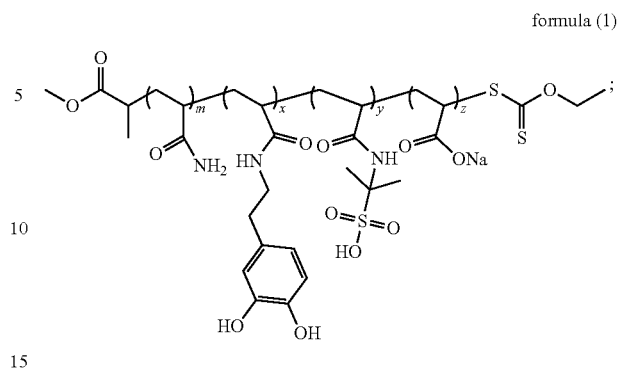

formula (1)

in the formula (1), m was 60, x was 4, y was 10, and z was 10.

Example 3

The Example served to illustrate the mussel biomimetic heat-resistant and salt-tolerant thickener prepared with the preparation method of the present disclosure.

The differences between the mussel biomimetic heat-resistant and salt-tolerant thickener used in the Example and the polymer S1 in Example 1 resided in that the ratio of the functional monomers was changed, and the percentage of the mussel biomimetic supramolecular interaction was further reduced, specifically:

(1) sodium hydroxide solution with a concentration of 1.0 mol·L$^{-1}$ and acrylic acid were blended to form an aqueous sodium acrylate (AANa) solution;

(2) Acrylamide (AM), sodium acrylate (AANa), 3-acrylamido dopamine (AM-DOPA), and 2-acrylamide-2-methylpropanesulfonic Acid (AMPS) were added into the aqueous solution according to the molar ratio of AM:AANa:DOPA:AMPS=75:5:5:15, and a chain transfer agent (PAM-X) with the mass concentration of 0.45% was added into the aqueous solution, wherein the solution concentration was 30%, the materials were dissolved by magnetically stirring, nitrogen gas was introduced to remove oxygen gas for 40 min to obtain a first reaction system;

(3) an initiator azobisisobutylamidine hydrochloride (AIBA) with a mass concentration of 0.1% was added into the first reaction system, it was subjected to the water bath heating at 50° C. and reaction for 6 hours to obtain a second reaction system;

(4) the absolute ethyl alcohol was used for repeatedly cleaning the second reaction system, and the system was subjected to vacuum drying treatment at 50° C. to obtain a mussel biomimetic heat-resistant and salt-tolerant thickener (p[AM-AANa-DOPA-AMPS]), which was labeled as S3.

In addition, the prepared mussel biomimetic heat-resistant and salt-tolerant thickener S3 had a general formula shown in formula (1):

formula (1)

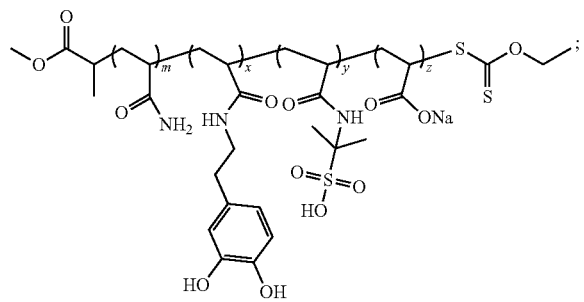

in the formula (1), m was 63, x was 4, y was 6, and z was 9.

Example 4

The Example served to illustrate the supramolecular interaction enhanced gel fracturing fluid prepared with the preparation method of the present disclosure.

As shown in FIG. 2, the method of preparing the supramolecular interaction enhanced gel fracturing fluid included the following steps:
(1) the mussel biomimetic heat-resistant and salt-tolerant thickener S1 having a mass concentration of 0.6% prepared in Example 1 was added into a certain amount of water, and stirred until the polymer was completely dissolved, a first reaction system was obtained;
(2) an organic zirconium cross-linking agent with a mass fraction of 0.6% was slowly added into the first reaction system, stirred until the cross-linking agent was fully and mutually dissolved, and subjected to an oven aging reaction at 70° C. to obtain the supramolecular interaction enhanced gel fracturing fluid, which was labeled as Z1.

Figure 4:
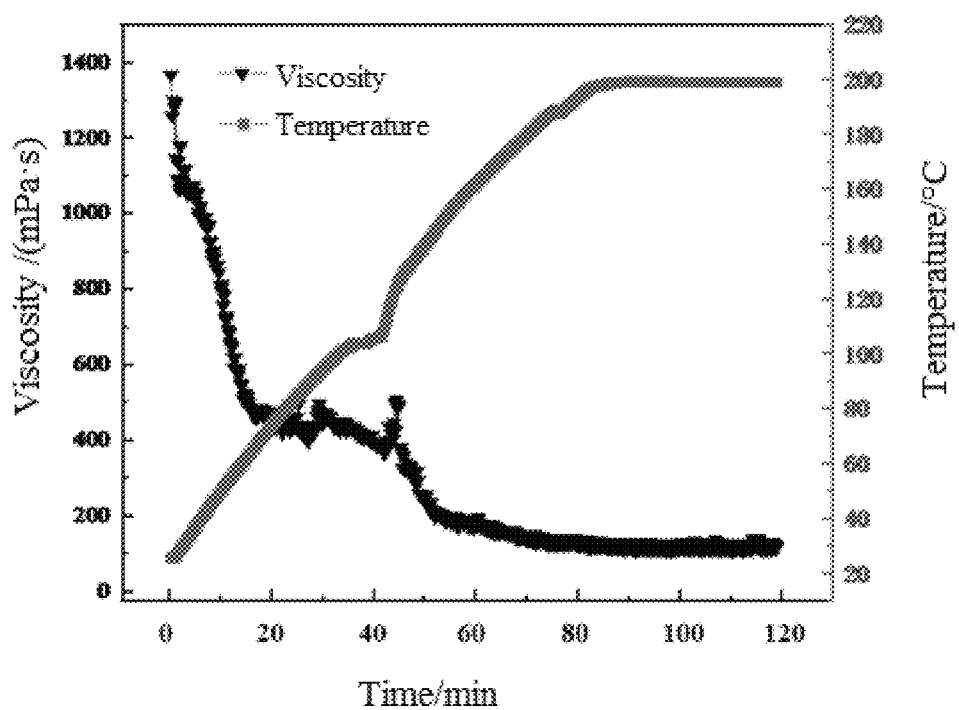
FIG. 4 illustrates a variation diagram of shear viscosity over time of a supramolecular interaction enhanced gel fracturing fluid formed by the mussel biomimetic heat-resistant and salt-tolerant thickener (p[AM-AANa-DOPA-AMPS]) provided by Example 4 of the present disclosure and organic zirconium under the shear rate of 170 $s^{-1}$ and the temperature of 200° C.
Figure 5:
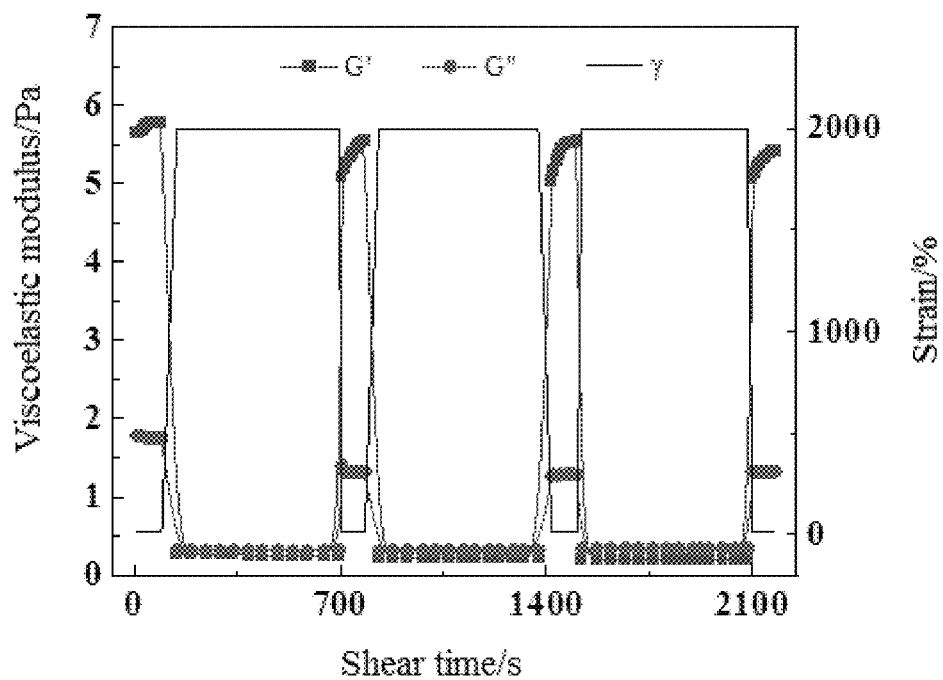
FIG. 5 illustrates a large strain cycle shear curve of a supramolecular interaction enhanced gel fracturing fluid formed by the mussel biomimetic heat-resistant and salt-tolerant thickener (p[AM-AANa-DOPA-AMPS]) provided by Example 4 of the present disclosure and organic zirconium.

As shown in FIG. 4 and FIG. 5, the supramolecular interaction enhanced zirconium gel fracturing fluid prepared from tap water and 0.6% of thickener had a retained viscosity of about 85.7 mPa·s after shearing for 2 h under the shearing rate of 170 s$^{-1}$ and the temperature of 200° C., and the recovery rate of the viscosity after the rupturing and shearing reached 92.1%.

Example 5

The Example served to illustrate the supramolecular interaction enhanced gel fracturing fluid prepared with the preparation method of the present disclosure.

The mussel biomimetic heat-resistant and salt-tolerant thickener used in the Example was completely consistent with the polymer S1 obtained in Example 1, and the preparation method of the supramolecular interaction enhanced gel fracturing fluid was similar to that in Example 4, except that the cross-linking agent "0.6% organic zirconium" was replaced with "1.2% phenolic resin", and the reaction temperature was 75° C.

Specifically, the mussel biomimetic heat-resistant and salt-tolerant thickener having a mass concentration of 0.6% was added into a certain amount of water, and stirred until the polymer was completely dissolved, a first reaction system was obtained; a phenolic resin cross-linking agent with the mass fraction of 1.2% was slowly added into the first reaction system, stirred until the cross-linking agent was fully and mutually dissolved, and subjected to an oven aging reaction at 75° C. to obtain the supramolecular interaction enhanced gel fracturing fluid, which was labeled as Z2.

Figure 6:
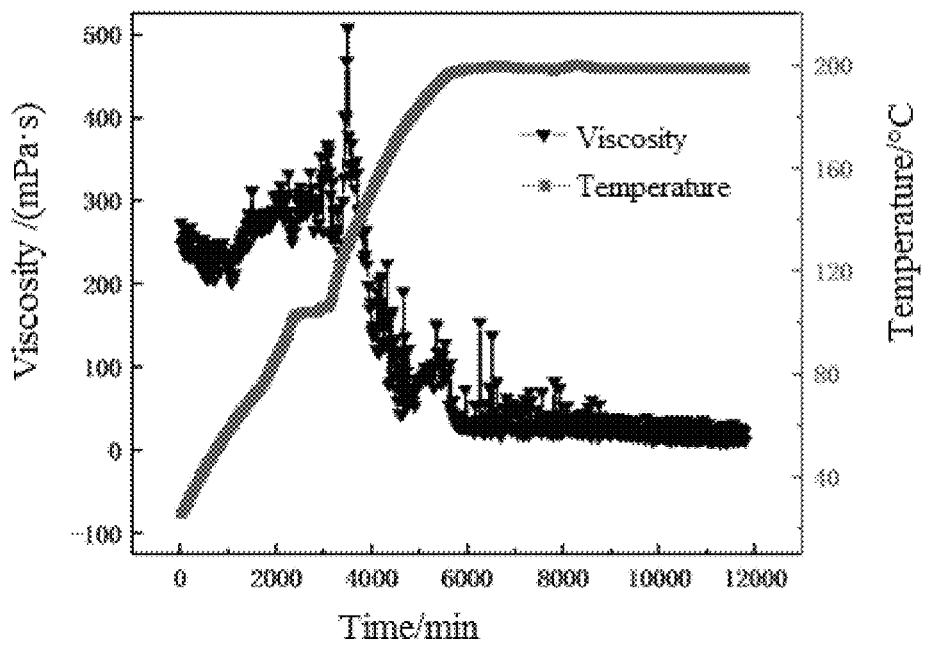
FIG. 6 illustrates a variation diagram of shear viscosity over time of a supramolecular interaction enhanced gel fracturing fluid formed by the mussel biomimetic heat-resistant and salt-tolerant thickener (p[AM-AANa-DOPA-AMPS]) provided by Example 5 of the present disclosure and a phenolic resin under the shear rate of 170 $s^{-1}$ and the temperature of 200° C.

As shown in FIG. 6, the supramolecular interaction enhanced phenolic resin gel fracturing fluid prepared from tap water and 0.6% of thickener had a retained viscosity of about 61.1 mPa·s after shearing for 2 h under the shearing rate of 170 s$^{-1}$ and the temperature of 200° C.

Example 6

The Example served to illustrate the supramolecular interaction enhanced gel fracturing fluid prepared with the preparation method of the present disclosure.

The mussel biomimetic heat-resistant and salt-tolerant thickener used in the Example was completely consistent with the polymer S1 obtained in Example 1, and the preparation method of the supramolecular interaction enhanced gel fracturing fluid was similar to that in Example 4, except that the cross-linking agent "0.6% organic zirconium" was replaced with "0.25% polyethylene imine", and the reaction temperature was 125° C.

Specifically, the mussel biomimetic heat-resistant and salt-tolerant thickener having a mass concentration of 0.6% was added into a certain amount of water and stirred until the polymer was completely dissolved, a first reaction system was obtained; a polyethylene imine cross-linking agent with the mass fraction of 1.2% was slowly added into the first reaction system, stirred until the cross-linking agent was fully and mutually dissolved, and subjected to an oven aging reaction at 125° C. to obtain the supramolecular interaction enhanced gel fracturing fluid, which was labeled as Z3.

Figure 7:
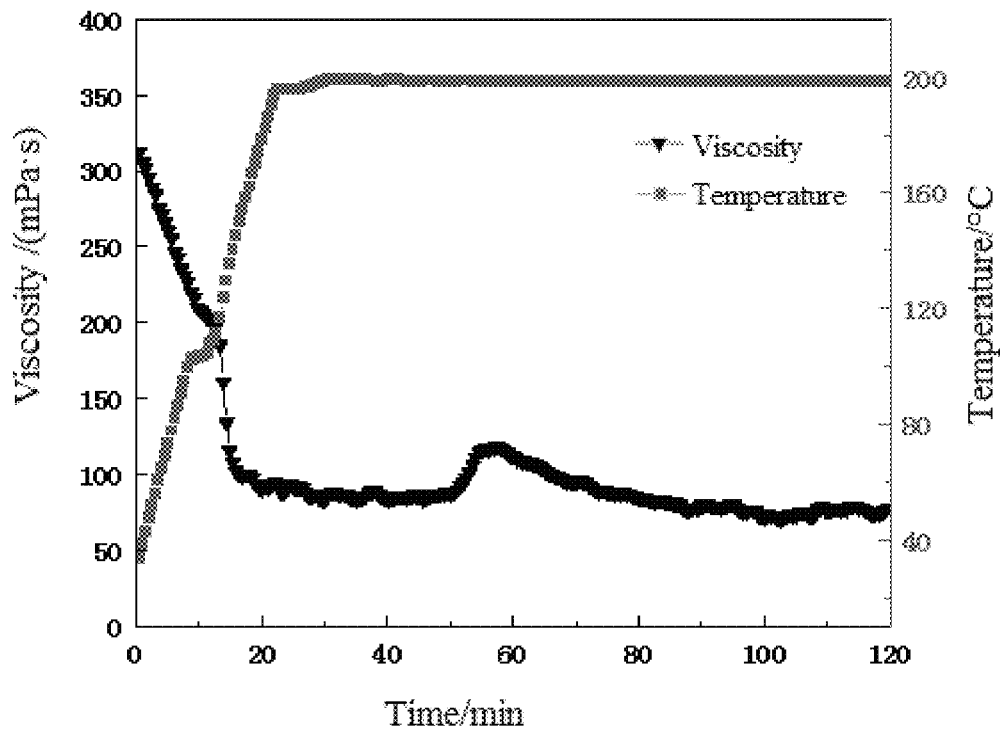
FIG. 7 illustrates a variation diagram of shear viscosity over time of a supramolecular interaction enhanced gel fracturing fluid formed by the mussel biomimetic heat-resistant and salt-tolerant thickener (p[AM-AANa-DOPA-AMPS]) provided by Example 6 of the present disclosure and polyethylene imine under the shear rate of 170 $s^{-1}$ and the temperature of 200° C.

As shown in FIG. 7, the supramolecular interaction enhanced polyethylene imine gel fracturing fluid prepared from tap water and 0.6% of thickener had a retained viscosity of about 77.8 mPa·s after shearing for 2 h under the shearing rate of 170 s$^{-1}$ and the temperature of 200° C.

Example 7

The Example served to illustrate the supramolecular interaction enhanced gel fracturing fluid prepared with the preparation method of the present disclosure.

The polymer S2 in Example 2 was used as a thickener, the preparation method of the supramolecular interaction enhanced gel fracturing fluid was consistent with that in Example 3, the prepared supramolecular interaction enhanced gel fracturing fluid was labeled as Z4.

Example 8

The Example served to illustrate the supramolecular interaction enhanced gel fracturing fluid prepared with the preparation method of the present disclosure.

The polymer S3 in Example 3 was used as a thickener, the preparation method of the supramolecular interaction enhanced gel fracturing fluid was consistent with that in Example 3, the prepared supramolecular interaction enhanced gel fracturing fluid was labeled as Z5.

Comparative Example 1

The mussel biomimetic heat-resistant and salt-tolerant thickener was prepared according to the same manner as in Example 1, the Comparative Example was different from the polymer S1 in Example 1 in that the mussel biomimetic catechol monomer was removed, and the p[AM-AANa- AMPS] ternary polymerization was carried out; and the molar ratio of AM:AANa:AMPS was modified, in particular:

(1) sodium hydroxide solution with a concentration of 1.0 mol·L$^1$ and acrylic acid were blended to form an aqueous sodium acrylate (AANa) solution;
(2) Acrylamide (AM), sodium acrylate (AANa), and 2-acrylamide-2-methylpropanesulfonic Acid (AMPS) were added into the aqueous solution according to the molar ratio of AM:AANa:AMPS=80:5:15, and a chain transfer agent (PAM-X) with the mass concentration of 0.45% was added into the aqueous solution, wherein the solution concentration was 30%, the materials were dissolved by magnetically stirring, nitrogen gas was introduced to remove oxygen gas for 40 min to obtain a first reaction system;
(3) an initiator azobisisobutylamidine hydrochloride (AIBA) with a mass concentration of 0.1% was added into the first reaction system, it was subjected to the water bath heating at 50° C. and reaction for 6 hours to obtain a second reaction system;
(4) the absolute ethyl alcohol was used for repeatedly cleaning the second reaction system, and the system was subjected to vacuum drying treatment at 50° C. to obtain a heat-resistant and salt-tolerant thickener (p[AM-AANa-AMPS]), which was labeled as DS1.

In addition, the prepared heat-resistant and salt-tolerant thickener DS1 had a general formula shown in formula (3):

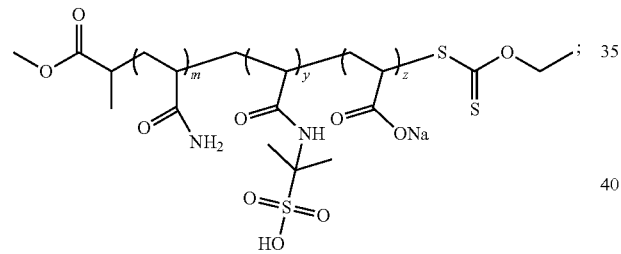

formula (3)

in the formula (3), m was 63, y was 10, and z was 8.

Comparative Example 2

The mussel biomimetic heat-resistant and salt-tolerant thickener was prepared according to the same manner as in Example 1, the mussel biomimetic heat-resistant and salt-tolerant thickener used in Comparative Example 2 was different from the polymer S1 in Example 1 in that the 2-acrylamide-2-methylpropanesulfonic acid was removed, and the p[AM-AANa-DOPA]ternary polymerization was carried out; and the molar ratio of AM:AANa:DOPA was modified, in particular:

(1) sodium hydroxide solution with a concentration of 1.0 mol·L$^1$ and acrylic acid were blended to form an aqueous sodium acrylate (AANa) solution;
(2) Acrylamide (AM), sodium acrylate (AANa), and 3-acrylamido dopamine (AM-DOPA) were added into the aqueous solution according to the molar ratio of AM:AANa:DOPA=88:5:7, and a chain transfer agent (PAM-X) with the mass concentration of 0.45% was added into the aqueous solution, wherein the solution concentration was 30%, the materials were dissolved by magnetically stirring, nitrogen gas was introduced to remove oxygen gas for 40 min to obtain a first reaction system;
(3) an initiator azobisisobutylamidine hydrochloride (AIBA) with a mass concentration of 0.1% was added into the first reaction system, it was subjected to the water bath heating at 50° C. and reaction for 6 hours to obtain a second reaction system;
(4) the absolute ethyl alcohol was used for repeatedly cleaning the second reaction system, and the system was subjected to vacuum drying treatment at 50° C. to obtain a mussel biomimetic heat-resistant and salt-tolerant thickener (p[AM-AANa-DOPA]), which was labeled as DS2.

In addition, the prepared mussel biomimetic heat-resistant and salt-tolerant thickener DS2 had a general formula shown in formula (4):

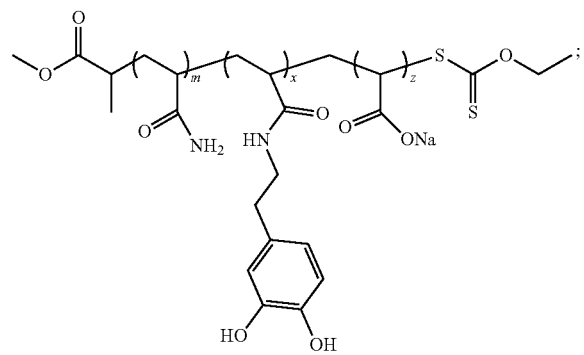

formula (4)

in the formula (4), m was 63, x was 6, and z was 10.

Comparative Example 3

The polymer DS1 (p[AM-AANa-AMPS]) in Comparative Example 1 was used as a thickener, the preparation method of the supramolecular interaction enhanced gel fracturing fluid was the same as that of Example 3, and the prepared supramolecular interaction enhanced gel fracturing fluid was labeled as D1.

Figure 8:
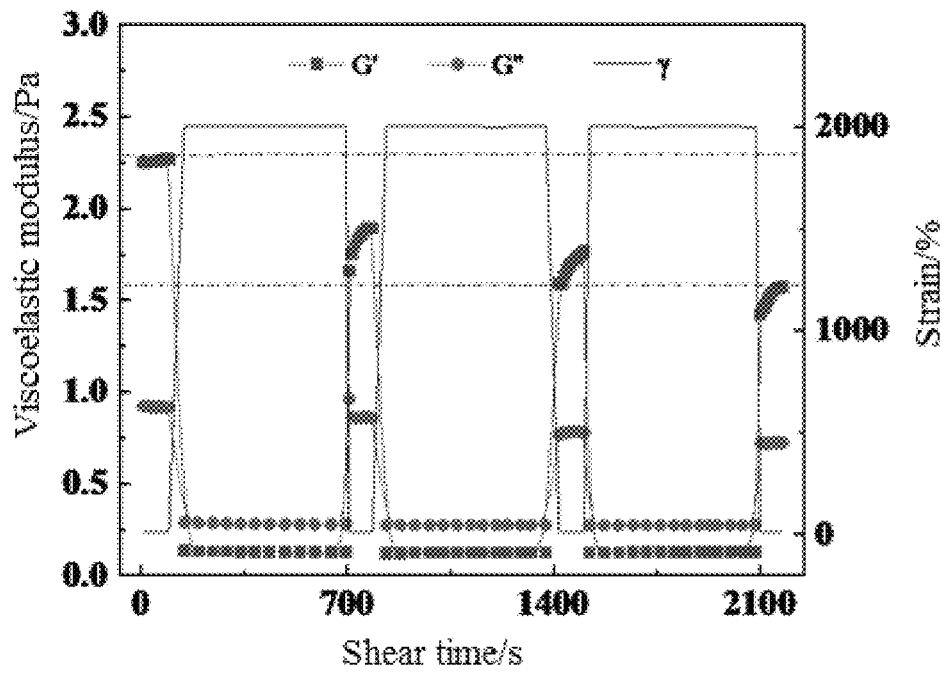
FIG. 8 illustrates a large strain cycle shear curve of a zirconium gel fracturing fluid formed with a thickener (not containing the mussel biomimetic monomer) (p[AM-AANa-AMPS]) provided by Comparative Example 3 of the present disclosure and organic zirconium.

As shown in FIG. 8, the viscosity recovery rate of the zirconium gel fracturing fluid prepared from tap water and 0.6% of thickener (p[AM-AANa-AMPS]) after the rupturing and shearing was only 69.9%.

Comparative Example 4

The polymer DS2 (p[AM-AANa-DOPA]) in Comparative Example 2 was used as a thickener, the preparation method of the supramolecular interaction enhanced gel fracturing fluid was the same as that of Example 3, and the prepared supramolecular interaction enhanced gel fracturing fluid was labeled as D2.

Comparative Example 5

The polymer DS2 (p[AM-AANa-DOPA]) in Comparative Example 2 was used as a thickener, the preparation method of the supramolecular interaction enhanced gel fracturing fluid was the same as that of Example 4, and the prepared supramolecular interaction enhanced gel fracturing fluid was labeled as D3.

Test Example

The retained viscosity and the shear recovery rate of the gel fracturing fluids prepared in Examples 4-8 and Comparative Examples 3-5 were measured as technical indexes, and the measurement results were shown in Table 2.

Wherein the retained viscosity was measured by setting the shear rate to be constant $170s^{-1}$, heating the fracturing fluids to 200° C., and setting the shear time to be 2 h according to the oil & gas industrial standard "Recommended practices on measuring the properties of water-based fracturing fluid" (SY/T 5107-2005) of the People's Republic of China (PRC).

The shear recovery rate was obtained through the strain cycle shear experiment, the test temperature was set to be 25° C., the angular frequency was constant ($\omega=6.28$ rad·s$^{-1}$), the strain scanning test was carried out, the strain variation range was within the range of 1%-5,000%, the two modulus curves can be intersected, the critical breakdown point (the intersection point of G' and G") was determined, one value before and after the critical breakdown point was then taken respectively to carry out multiple cycles of shear strain oscillation scanning, the scanning was continued for 600 s under the high-shear rupture strain, and continued for 100 s under the low-shear strain, the elastic modulus recovery rate of the gel was obtained through calculation, the gel viscosity resilience was evaluated.

TABLE 1

| No. | Fracturing fluids | | Thickeners | Cross-linking agents | Retained viscosity/ m · Pas | Shear recovery rate/% |
|---|---|---|---|---|---|---|
| Example 4 | Z1 | S1 | AM:AANa:DOPA:AMPS = 73:5:7:15 | Organic zirconium | 85.7 | 92.1 |
| Example 5 | Z2 | S1 | AM:AANa:DOPA:AMPS = 73:5:7:15 | Phenolic resin | 61.1 | 85.9 |
| Example 6 | Z3 | S1 | AM: AANa:DOPA: AMPS = 73:5:7:15 | Polyethylene imine | 77.8 | 87.7 |
| Example 7 | Z4 | S2 | AM:AANa:DOPA:AMPS = 65:5:15:15 | Organic zirconium | 80.7 | 91.0 |
| Example 8 | Z5 | S3 | AM:AANa:DOPA: AMPS = 75:5:5:15 | Organic zirconium | 83.6 | 87.5 |
| Comparative Example 3 | D1 | DS 1 | AM: AANa: AMPS = 80:5:15 | Organic zirconium | 63.9 | 69.9 |
| Comparative Example 4 | D2 | DS 2 | AM:AANa:DOPA = 88:5:7 | Organic zirconium | 71.1 | 83.6 |
| Comparative Example 5 | D3 | DS 2 | AM:AANa:DOPA = 88:5:7 | Polyethylene imine | 53.8 | 89.7 |

The measurement results of Examples 4-8, and Comparative Examples 3-5 in Table 1 show that the supramolecular interaction enhanced gel fracturing fluid prepared in Example 4 of the present disclosure exhibits excellent properties in temperature-resistance, shearing-resistance; the supramolecular interaction enhanced zirconium gel fracturing fluid prepared from tap water and 0.6% of thickener has a retained viscosity up to 85.7 mPa·s after shearing for 2 h under the shearing rate of 170 s$^{-1}$ and the temperature of 200° C., and the recovery rate of the viscosity after the rupturing and shearing reaches 92.1%, both the retained viscosity and the viscosity recovery rate are desirable, it demonstrates that the supramolecular interaction enhanced gel fracturing fluid has a non-covalent-covalent composite network structure with a high-strength. The gel fracturing fluids have huge use potential in the aspect of efficient fracturing of deep/ultra-deep layer oil and gas reservoirs. In addition, the gel fracturing fluids containing a high content of DOPA exhibit the desirable shear recovery rate, and the gel fracturing fluids containing a metal cross-linking agent have a high retained viscosity.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:
1. A method for preparing a gel fracturing fluid comprising:
    S201: contacting a mussel biomimetic heat-resistant and salt-tolerant thickener with water to obtain a reaction system S201, wherein the mussel biomimetic heat-resistant and salt-tolerant thickener comprises structural units represented by formulae (a) to (f):

formula (a)
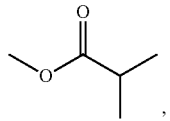

formula (b)
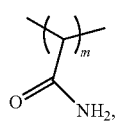

formula (c)
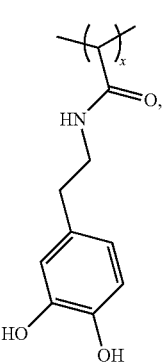

formula (d)
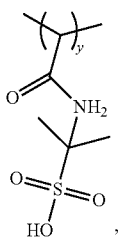

formula (e)
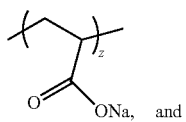

formula (f)
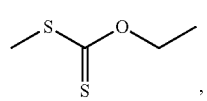

wherein m is within the range of 60-63, x is within the range of 4-7, y is within the range of 6-10, and z is within the range of 8-10; and S202: under the stirring condition, contacting the reaction system S201 with a cross-linking agent for performing the dissolution and aging reaction to prepare the gel fracturing fluid.

2. The method of claim 1, wherein the cross-linking agent is organic zirconium;

the mass ratio of the used amount of mussel biomimetic heat-resistant and salt-tolerant thickener to water is within the range of (5-8):(992-995);

preferably, the mass ratio of the used amount of organic zirconium to water is within the range of (5-16):(984-995).

3. The method of claim 1, wherein the reaction temperature is within the range of 65-80° C. when the cross-linking agent is organic zirconium.

\* \* \* \* \*